(12) United States Patent
Mudd et al.

(10) Patent No.: US 9,448,564 B2
(45) Date of Patent: Sep. 20, 2016

(54) GAS DELIVERY SYSTEM FOR OUTPUTTING FAST SQUARE WAVES OF PROCESS GAS DURING SEMICONDUCTOR PROCESSING

(71) Applicants: Daniel T. Mudd, Reno, NV (US); Patti J Mudd, Reno, NV (US)

(72) Inventors: Daniel T. Mudd, Reno, NV (US); Patti J Mudd, Reno, NV (US)

(73) Assignee: RENO TECHNOLOGIES, INC.

( * ) Notice: Subject to any disclaimer, the term of this patent is extended or adjusted under 35 U.S.C. 154(b) by 110 days.

(21) Appl. No.: 14/183,494

(22) Filed: Feb. 18, 2014

(65) Prior Publication Data

US 2014/0230915 A1    Aug. 21, 2014

Related U.S. Application Data

(60) Provisional application No. 61/850,503, filed on Feb. 15, 2013.

(51) Int. Cl.
*F15B 21/12* (2006.01)
*G05D 7/06* (2006.01)

(52) U.S. Cl.
CPC ............ *G05D 7/0647* (2013.01); *F15B 21/12* (2013.01); *Y10T 137/0441* (2015.04); *Y10T 137/86389* (2015.04)

(58) Field of Classification Search
CPC .............................. F15B 21/12; G05D 7/0647
See application file for complete search history.

(56) References Cited

U.S. PATENT DOCUMENTS

| | | | | |
|---|---|---|---|---|
| 3,453,861 A | * | 7/1969 | Levasseur | F15B 21/12 73/1.67 |
| 3,491,946 A | * | 1/1970 | Muller | F15B 21/12 235/201 ME |
| 3,504,692 A | * | 4/1970 | Goldstein | F15B 21/12 137/624.14 |
| 4,304,263 A | * | 12/1981 | Choate | F16L 55/04 137/624.15 |
| 6,015,590 A | | 1/2000 | Suntola | |
| 6,539,968 B1 | * | 4/2003 | White | G05D 7/0635 137/487.5 |
| 6,881,263 B2 | | 4/2005 | Lindfors et al. | |
| 7,037,372 B2 | | 5/2006 | Lindfors et al. | |
| 7,337,805 B2 | | 3/2008 | Brown et al. | |
| 7,370,664 B2 | | 5/2008 | Glite | |
| 7,682,946 B2 | | 3/2010 | Ma et al. | |
| 7,850,779 B2 | | 12/2010 | Ma et al. | |
| 7,922,150 B2 | * | 4/2011 | Cripps | F16K 27/003 251/129.15 |
| 7,974,544 B2 | | 7/2011 | Kobayashi | |

(Continued)

FOREIGN PATENT DOCUMENTS

EP    0671484    9/1995

*Primary Examiner* — Eric Keasel
(74) *Attorney, Agent, or Firm* — The Belles Group, P.C.

(57) ABSTRACT

A wave generation component during an off cycle when the on-off valve is closed to build pressure from the process gas in an accumulation volume. During an on cycle when the on-off valve is open the wave generation component releases the process gas according to a time constant. A flow restrictor installed downstream in a throat of the on-off valve, outputs the rapid square waves to the conduit at a predefined magnitude. The flow restrictor is selected to have an impedance that is high enough to significantly raise the time constant during the on cycle such that pressure decay in each square wave pulse over the on cycle decreases to within a tolerance, wherein the time constant is at least in part a function of the flow restrictor impedance.

18 Claims, 13 Drawing Sheets

(56) References Cited

U.S. PATENT DOCUMENTS

| | | | |
|---|---|---|---|
| 8,100,382 B2 * | 1/2012 | Robertson, III | F16K 31/06 251/129.15 |
| 8,187,381 B2 | 5/2012 | Sangam | |
| 8,282,992 B2 | 10/2012 | Myo et al. | |
| 8,291,857 B2 | 10/2012 | Lam et al. | |
| 8,293,015 B2 | 10/2012 | Lam et al. | |
| 8,343,279 B2 | 1/2013 | Myo et al. | |
| 8,382,897 B2 | 2/2013 | Sangam | |
| 8,408,245 B2 | 4/2013 | Feldman et al. | |
| 8,460,753 B2 | 6/2013 | Xiao et al. | |
| 8,511,337 B2 * | 8/2013 | Nishimura | G05D 7/0635 137/487.5 |
| 2005/0056211 A1 | 3/2005 | Lindfors et al. | |

* cited by examiner

GAS DELIVERY SYSTEM FOR OUTPUTTING FAST SQUARE WAVES OF PROCESS GAS DURING SEMICONDUCTOR PROCESSING

CROSS-REFERENCE TO RELATED APPLICATIONS

This application claims the benefit of priority under 35 U.S.C. 119(e) to U.S. Application No. 61/850,503, filed Feb. 15, 2013, entitled MEANS AND METHOD OF DELIVERING "FAST SQUARE" PULSES OF GAS, by Daniel T. Mudd et al., the contents of which are hereby incorporated by reference in its entirety.

FIELD OF THE INVENTION

The invention relates generally to semiconductor processing, and more specifically, improved gas delivery of process gas using mass flow controllers (MFCs) and electric regulators.

BACKGROUND OF THE INVENTION

Mass flow controllers (MFCs) and electronic regulators are important components of delivering process gasses (e.g., N2, O2, SF6, C4F8 . . . etc.) for semiconductor fabrication. Of particular interest are the atomic layer deposition (ALD) and three-dimensional integrated circuit (3DIC) processes which require the rapid and repeated changing or the gas species in the process chamber thousands of times to achieve the needed feature.

Changing the gas species in the chamber requires the interruption of the flow on one gas species and beginning the flow of a second gas species. One alternately turns on a Gas A and off a Gas B, and then turns off Gas B and turns on Gas A again. MFCs are normally used to turn on, turn off, and control process gas flows, however commercially available MFCs are slow to turn on and achieve controlled flow, typically having response times between 0.3 and 1.0 seconds, thereby creating a bottleneck in semiconductor processing, particularly for ADL and 3DIC processing.

Conventional techniques mitigate the processing bottleneck by using an MFC operating at a steady state and flowing into an on-off valve that opens and closes more rapidly (e.g., every 10 to 50 msec). With this approach, pressure builds up behind the on-off valve when closed during an off cycle because of the MFC continuously flows into an accumulation volume between the MFC and the on-off valve. Unfortunately, as shown in FIG. 1, when the on-off valve is opened at the beginning of an on cycle, the built up pressure in the accumulation volume initially causes a large flow of gas that quickly decays in magnitude to the steady state flow of the MFC as the stored pressure and mass is released, due to a small time constant from a low flow resistance (or nearly no flow resistance) in the on-off valve.

Figure 1:
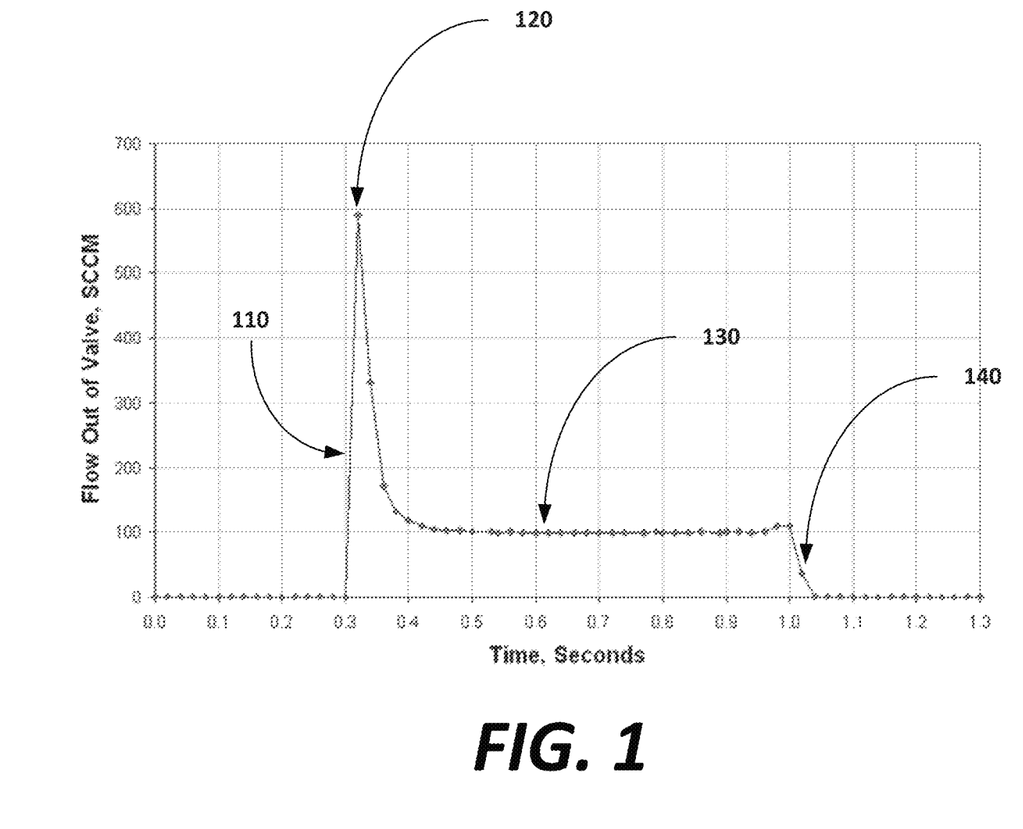
FIG. 1 is a graph of test data collected using special instrumentation to show an output wave produced by a mass flow controller (MFC)-based system of the prior art having an undesirable initial spike.

FIG. 1 shows a graph 100 of test data collected using special instrumentation to show an output wave produced by a system using an embodiment of the current method. During normal processing of semiconductors, instrumentation to observe the output wave in not available and thus actual flow profiles are unseen and often unknown. Problematically, a large, initial spike 120 is produced at the beginning of an on cycle. Due to the pressure build up when the on-off valve is closed, and high conductance of the on-off valve when opened, the process gas rushes through quickly in a ramp up 110 before peaking and then settling to a steady-state flow level 130 as desired. The magnitude ramps down 140 when the on-off valve is again closed during the off cycle.

The initial spike 120, however, is undesirable because it introduces an unseen, unintended, and uncontrolled event. This event can vary from system to system depending on the specific of the plumbing, air valves and supply pressure actuating the on-off valve (assuming the on-off valve is an air operated valve), and introduces a random element introducing variation in a process in which repeatability is desired. In addition, the presence of this large transient gas flow has been largely unknown and generally, large overshoots in gas flow are undesirable.

Therefore, what is needed is a technique in gas delivery systems to overcome the shortcomings of the prior art by repeatable outputting fast square waves of flow, which is reproducible from system to system, while minimizing an initial spike.

SUMMARY

The present invention addresses these shortcomings by providing gas delivery apparatus to output a process gas as rapid square waves by increasing a time constant.

In one embodiment, a time constant is increased, leading to improved rapid square waves for output from gas flows out of an accumulation volume between a gas supplying component (e.g., an MFC or electronic regulator) and an on-off valve. To do so, a high impedance flow restrictor is added in series with a valve seat of the on-off valve. An enclosure is attached to a base with a conduit channeling through the base to receive a supply of the process gas and output the process gas from the gas delivery apparatus to the semiconductor process.

In another embodiment, a wave generation component comprises a gas supply component or system and the on-off valve downstream from the gas supply component, coupled to receive the process gas in the conduit. The wave generation component during an off cycle when the on-off valve is closed to build pressure from the process gas in an accumulation volume. During an on cycle when the on-off valve is open the wave generation component releases the process gas according to a time constant.

In an embodiment, a flow restrictor installed in a throat of the on-off valve, outputs the rapid square waves of flow to the conduit at a predefined magnitude and duration. The flow restrictor is selected to have an impedance that is high enough to significantly raise the time constant of the flow out of the accumulation volume, during the on cycle, such that flow decay in each square wave pulse over the on cycle decreases to within a tolerance, wherein the time constant is at least in part a function of the flow restrictor impedance.

Advantageously, rapid square waves are produced with an initial flow at a desired magnitude and duration during an on cycle, with the magnitude remaining nearly constant.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Gas delivery apparatus, and methods, to output a process gas as rapid square waves by increasing a time constant of a gas flowing to a process during an on cycle, by installing flow restrictor having a specific high impedance.

Square Wave Output Characteristics of a Gas Delivery System

Figure 2A:
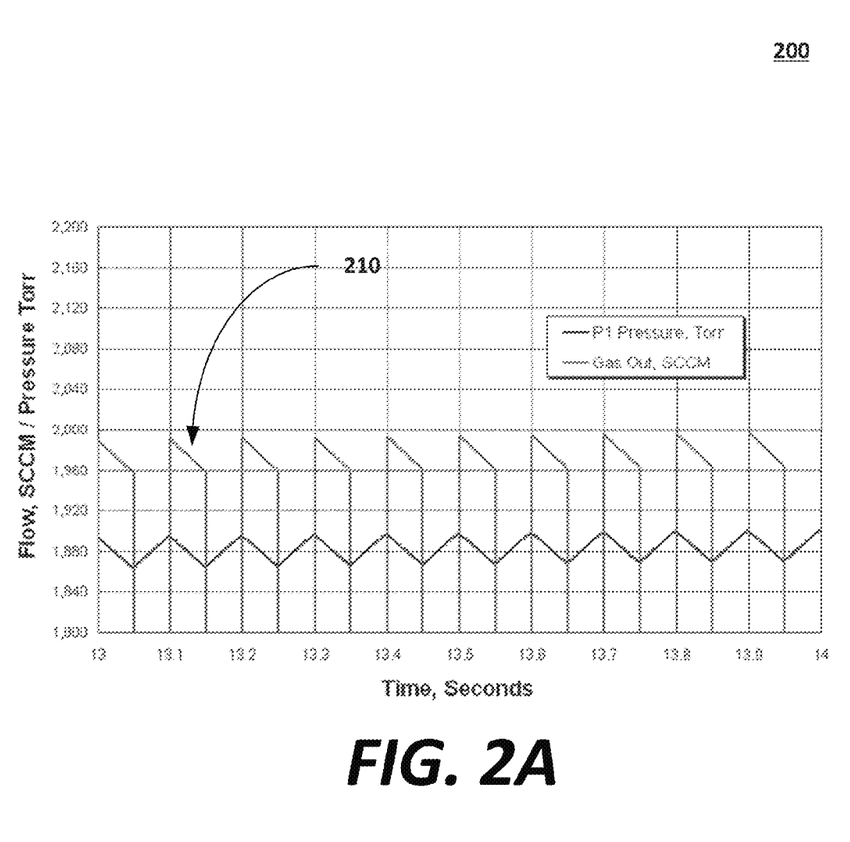
FIG. 2A is a graph illustrating the results of a computer simulation showing a series of square output waves produced by a gas delivery system with a properly sized and installed flow restrictor, in accordance with an embodiment of the present invention

FIG. 2A is a graph 200 illustrating the results of a computer simulation showing a series of square output waves produced by a gas delivery system with a properly sized and installed flow restrictor, in accordance with an embodiment of the present invention. Given the gas pressures used and the conductance of the on-off valves typically used with the current method, the addition of a flow restrictor can increases the flow impedance and hence the a time constant of the flow out of the on-off valve up to, for example, 60,000 times. The resulting square waves (such as square wave 210) are characterized by an on cycle at a desired magnitude of flow (and only minor decay which is affected by the sizing of the restrictor impedance for process gas flow), and an off cycle at a zero magnitude. During the on cycle, the magnitude ramps up over a leading edge, outputs at the desired magnitude during steady-state flow, and then ramps down to the zero magnitude over a trailing edge. During the off cycle, the magnitude preferably remains at zero.

Output waves are referred to as square waves, as an ideal, because of a desired consistent, steady-state magnitude during an on cycle. In implementation, the output waves are only substantially square or quasi-square waves because of limitations from physical characteristics of the system. Specifically, decay while outputting at the desired magnitude is referred to as droop and results from a time constant of the system as configured, as discussed below. An increased pressure, and hence accumulation mass, maintained in an accumulation volume during the on cycle, due to the increased flow impendence by adding the restrictor, keeps the output magnitude more consistent than the original rapidly decreasing pressure due to the low flow impendence. Relative to the prior art output wave 110 of FIG. 1, the undesirable spike at ramp up been eliminated due to the drastically increased time constant designed from installation of a flow restrictor. Accordingly, during the on cycle, flow from an accumulation volume is relatively constant.

Figure 2B:
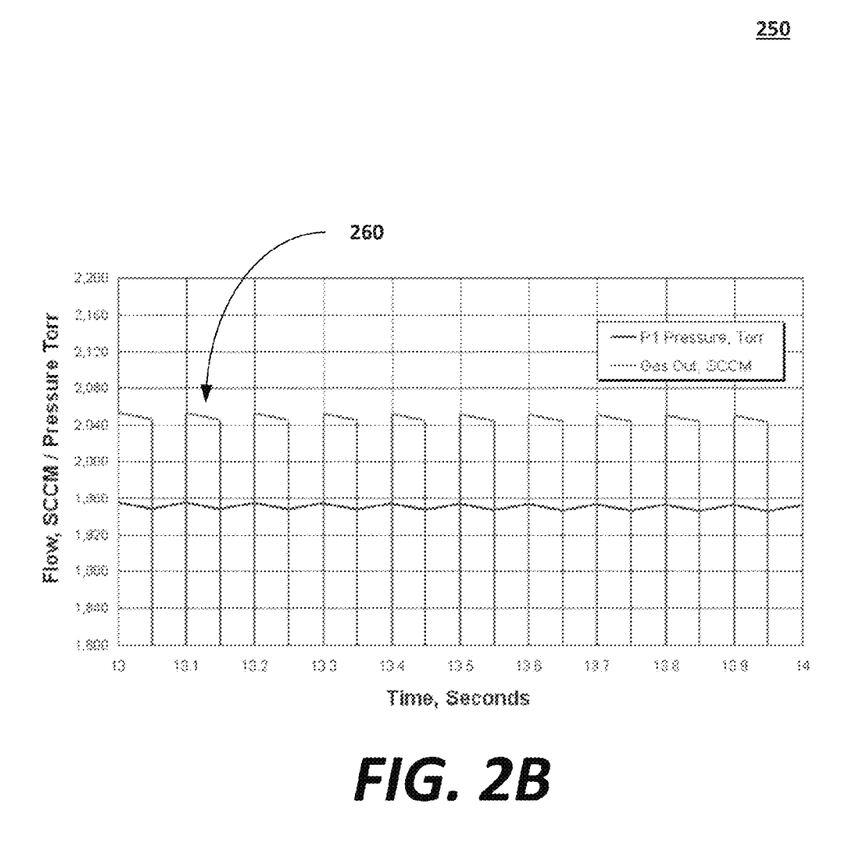
FIG. 2B is a graph of square output waves produced by a gas delivery system with a property sized and installed flow restrictor, and an increased accumulation volume, in accordance with an embodiment of the present invention.

FIG. 2B is a graph 250 of square output waves produced by a gas delivery system with a property sized and installed flow restrictor, and an increased accumulation volume, 5 times the value of FIG. 2A, in accordance with an embodiment of the present invention. The square waves (such as wave 260) possess the same advantage as the square waves of FIG. 2A in eliminating the large spike at ramp up. The droop, however, in the MFC embodiment is less prominent because the increased accumulation volume further increases the time constant relative to FIG. 2A.

Figure 3:
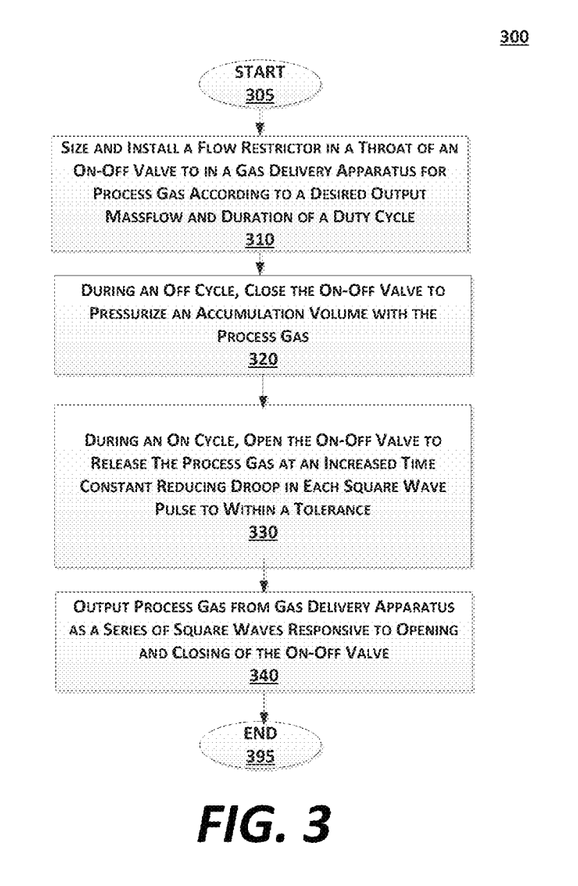
FIG. 3 is a flow chart illustrating a method for producing square waves in a gas delivery system, according to an embodiment of the present invention.

Methods for producing the improved fast square waves are discussed below in FIGS. 3A-B, and hardware is set forth in FIGS. 5A-B and 6A-B).

Methods for Square Wave Output of Gas Delivery

FIG. 3 is a flow chart illustrating a method 300 for producing square waves in a gas delivery system, according to an embodiment of the present invention.

At step 310, a flow restrictor is sized and installed in a throat of an on-off valve. A proper size primarily depends on the available supply pressure, a desired output flow (e.g., a maximum flow target), and a ratio of the on-cycle time to the total on-cycle and off-cycle time, and the desired time constant (which determines droop). For instance, the lower the selected flow coefficient, i.e. higher flow impendence, of a flow restrictor, the higher the resulting pressure drop across the combination of the on-off valve and the flow restrictor. The relationship of time constant to wave shape is described in association with FIGS. 4A-D.

During an off cycle at step 320, the on-off valve is closed, so the process gas builds pressure in an accumulation volume of conduit located upstream from a wave generation component. For example, an MFC in the wave generation component can deliver a continuous predefined mass flow to the accumulation volume, or an electronic regulator in the wave generation component can pressurize the accumulation volume, based on set points calculated by processors. As a result, pressure builds in the accumulation volume until the on-off valve opens.

During an on cycle at step 330, the on-off valve is opened, allowing the process gas to pass through a throat of the on-off valve, through the flow restrictor. Because the on-off valve essentially has nearly infinite impedance when closed and nearly zero impedance when open, gas delivery is unregulated at this point, leading to a spike if a restrictor of markedly higher impedance has not been placed in series with the on-off valve.

However, under the present technique, the flow restrictor is characterized with a significantly higher impedance, relative to the on-off valve, to further regulate gas flow. In some embodiments, the impedance is selected to drastically increase a time constant during a specific duration of the on cycle by decreasing a flow capacity on the order of, for example, 60,000 times or more while still delivering gas at an appropriate magnitude of flow, as described more fully below.

At step 340, process gas is output from the gas delivery apparatus as a series of (quasi) square waves responsive to opening and closing of the on-off valve.

FIGS. 4A-D are graphs illustrating time constant decay for a linear gas delivery system, according to one embodiment of the present invention. One of ordinary skill in the art will understand, given the disclosure herein, application of the same principles to a non-linear gas delivery system.

Figure 4A:
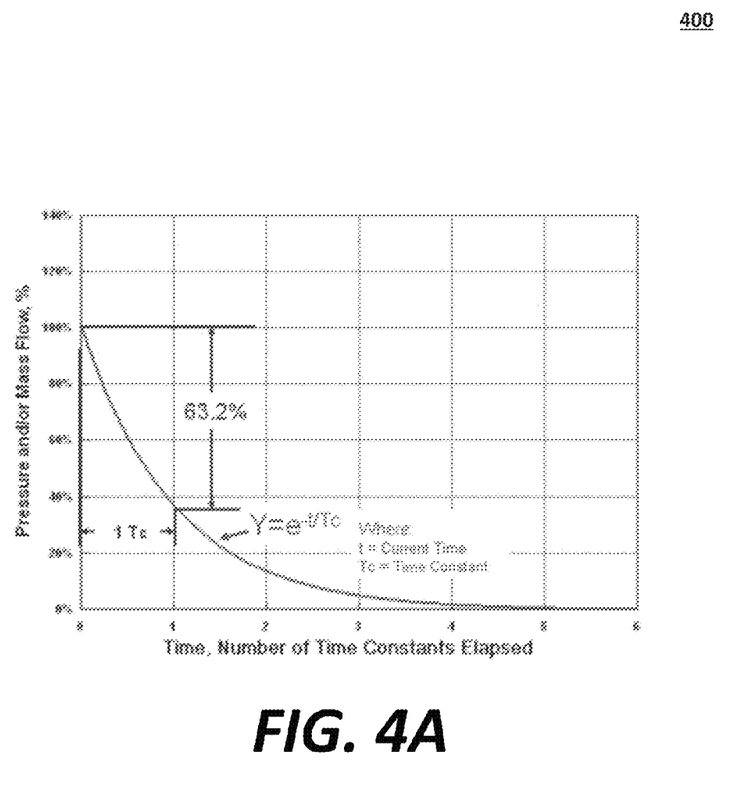
FIGS. 4A-D are graphs illustrating time constant decay for a linear gas delivery system, according to one embodiment of the present invention.

In FIG. 4A, a time constant is defined as the amount of time required for an initial variable (pressure or mass flow) to decay by 63.2% in route to steady state flow at 0%. The time constant is a defined as: $Tc=(V*DP)/m$, where V is an accumulation volume, DP is a total variable drop (pressure or mass flow) between an initial time and infinity, and m is the initial mass flow rate (or pressure drop rate) out of the accumulation volume. Therefore, the time constant is a function of the initial mass flow rate which is drastically reduced by a flow restrictor to drastically increase the time constant. Furthermore, the time constant is also a function of accumulation volume and can be increased to further raise the time constant. Accumulation volume, however, is limited to the available space for the device and, as such, cannot be viably increased to have the same order of affect as the flow restrictor impedance.

Figure 4B:
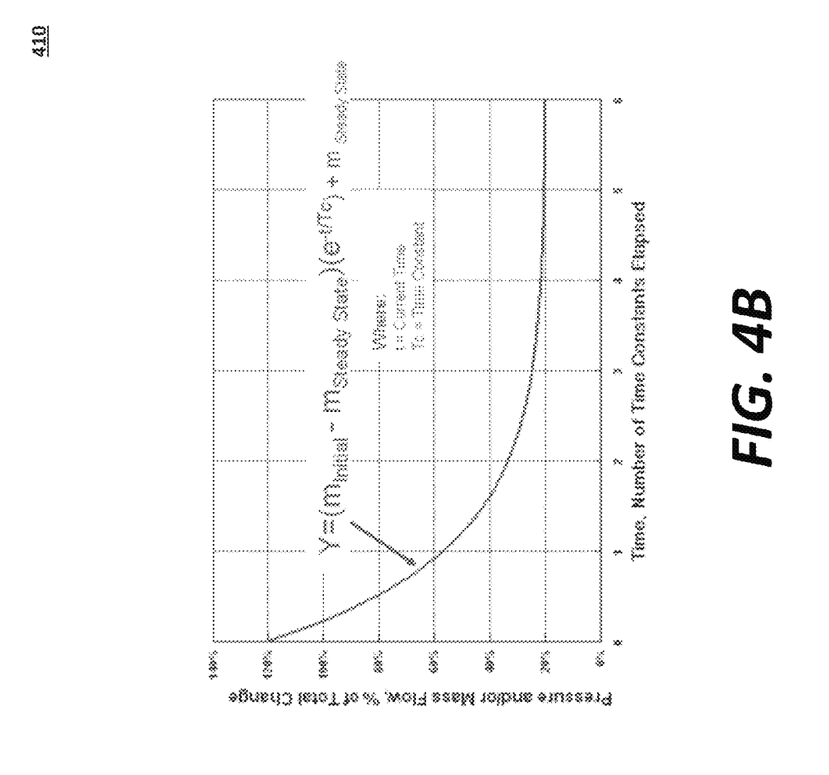

In contrast to FIG. 4A, in FIG. 4B, a 20% flow into the volume is superimposed on the decay as described in FIG. 4A which results in a 20% flow at steady state flow after several time constants have passed.

Figure 4C:
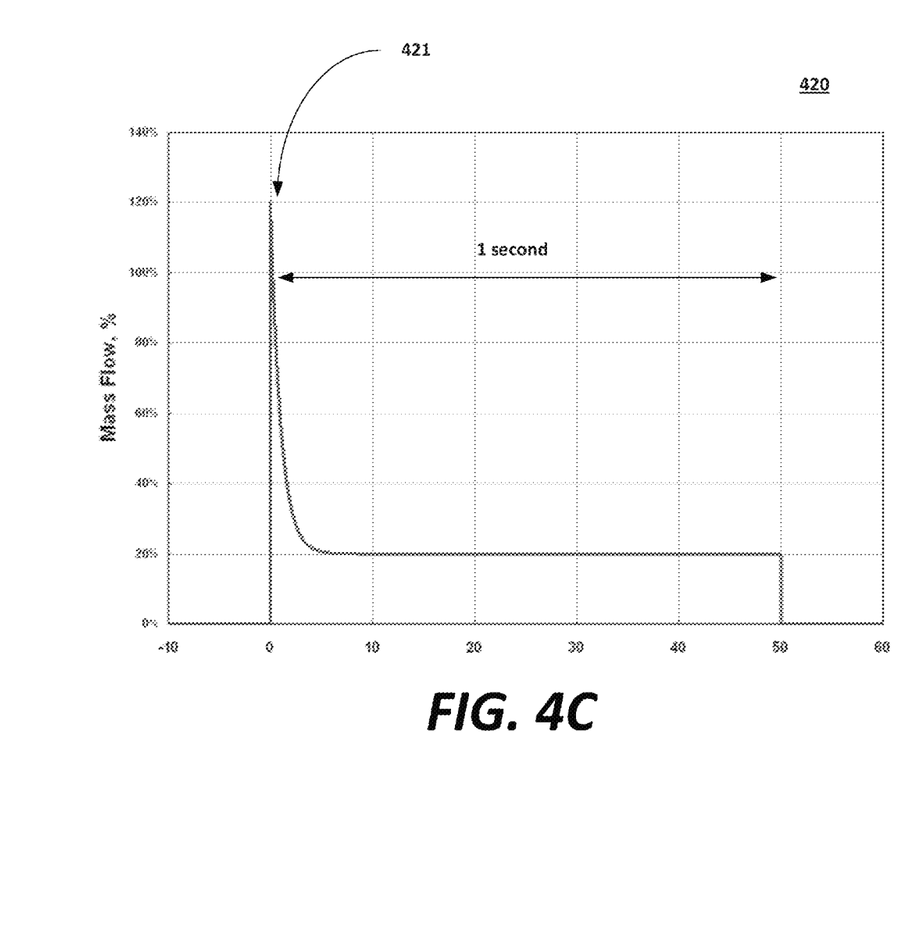
Figure 4D:
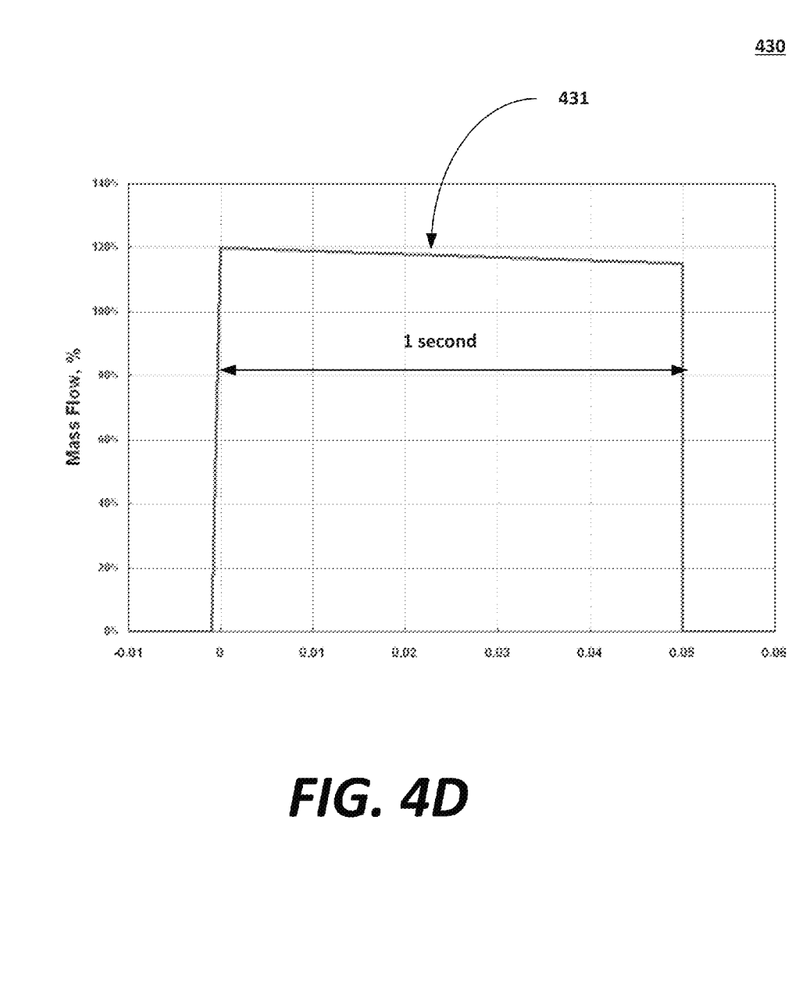

In FIG. 4C, the decay of FIG. 4B to 20% flow is shown over a large span of time constants for a 1 second on cycle. From this perspective, the decay to steady state resembles the conventional system of FIG. 1, with a large spike 421 at ramp up before reaching steady state. In other words, a time decay of the spike is small relative to an on cycle. On the other hand, FIG. 4D shows a time decay that is large relative to the same 1 second on cycle. Fewer time constants elapse in FIG. 4D than 4C over the same amount of time, so the spike 421 is reduced to a modest droop 431. The period of interest for the on cycle of a square wave according to FIG. 4D ends before significant pressure decay from the large time constant. The pressure decay from the smaller time constant of FIG. 4C is undesirable.

Accordingly, a flow restrictor is introduced to a gas delivery system markedly increases the decay time in order to bring droop, during an on cycle, within tolerance of a specific semiconductor process.

Systems for Gas Delivery a Square Wave Output

Figure 5:
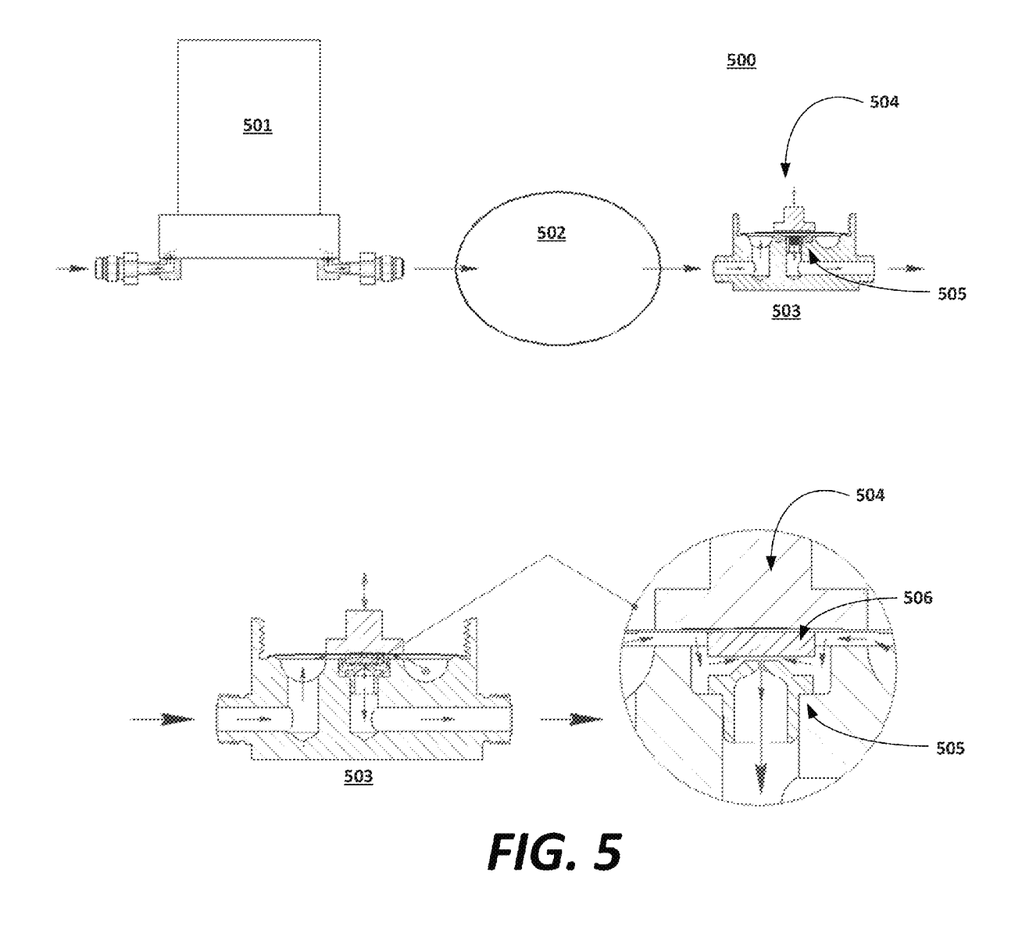
FIG. 5 is a high-level schematic diagram conceptually illustrating a system 500 to produce a square wave using an MFC, according to one embodiment of the present invention.

FIG. 5 is a high-level schematic diagram conceptually illustrating a system 500 to produce a square wave using an MFC, according to one embodiment of the present invention.

A wave generation system or component includes an MFC 501 coupled to an on-off valve 504 within component 503. An accumulation volume 502 is shown conceptually as an aggregate of volume between the MFC 501 and the on-off valve 504. For instance, conduit volume, spacing within components, and even additional accumulation chambers can all add to a total accumulation volume.

The on-off valve 504 can be air actuated to move up and down to open and close during on and off cycles, respectively. When the on-off valve 504 moves up to open, process gas in the conduit is markedly unrestricted by the open valve seat of the on off valve but is primarily restricted by flow restrictor 505. (Note to Dorian: The restrictor can be located either upstream or downstream of the valve seat of the on off valve.) The flow restrictor 505 is sized and installed in a throat of an on-off valve seat 506. The restrictor 505 can be selected so that the flow impendence provides a predefined amount of restriction to gas flow from the accumulation volume 502. Sizing can refer to a size of an opening, porosity of a sintered media, or diameter of a long capillary tube. In some embodiments, a flow node is implemented in component 503, as shown in FIG. 6.

Figure 6:
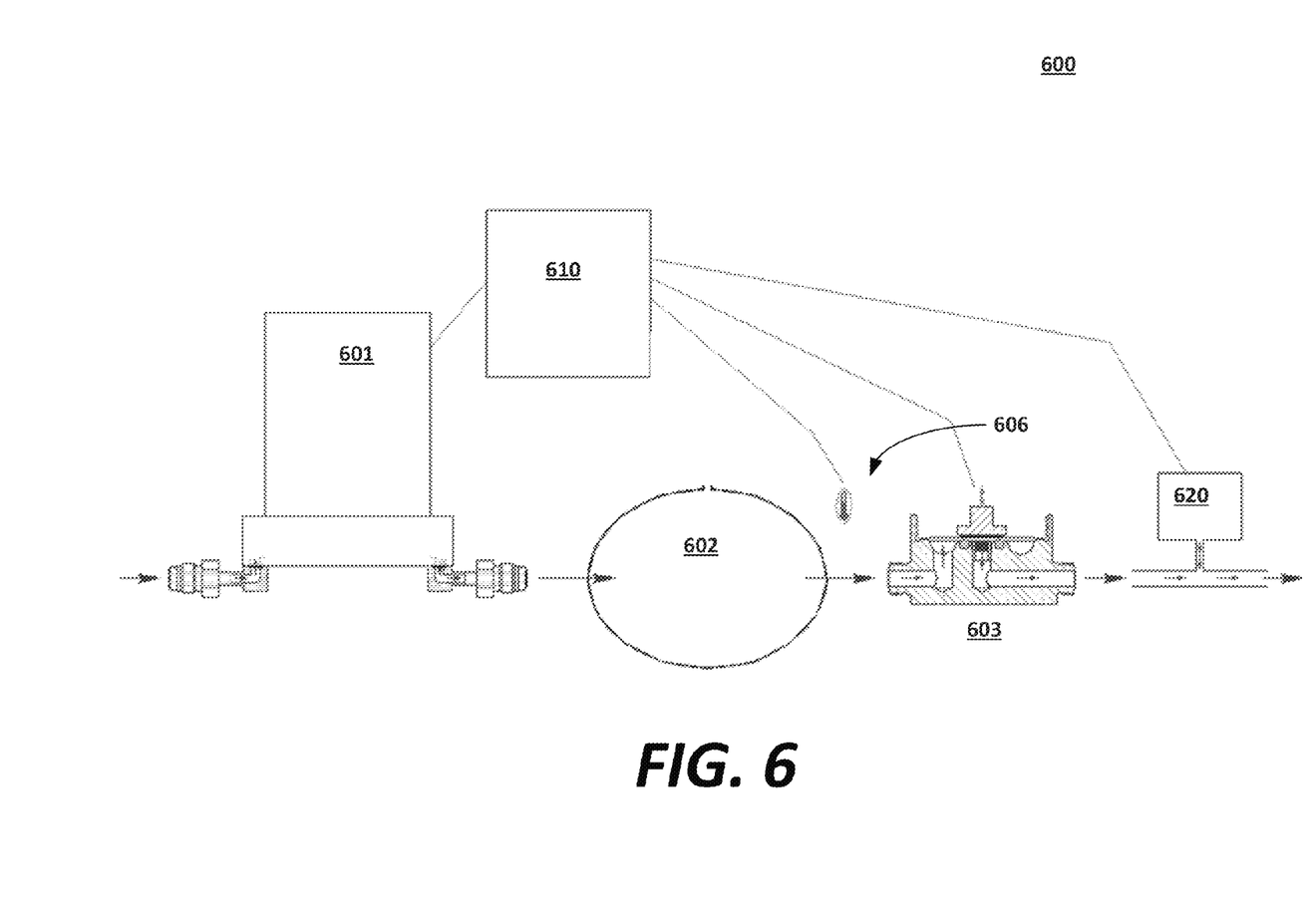
FIG. 6 is a schematic diagram illustrating a system 600 to produce a square wave using a flow node, according to one embodiment of the present invention.

FIG. 6 is a schematic diagram illustrating a system 600 to produce a square wave optionally using a flow node, according to one embodiment of the present invention. In general, a flow node can be used along with a pressure reading from the electronic regulator 601 to measure pressure at the inlet of the restrictor, even if the restrictor is downstream of the valve seat of the on-off valve, because the flow resistance is negligible between the on-off valve seat in component 603 and the upstream electronic regulator 601. In alternative embodiments, electronic regulator 601 is replaced with a proportional valve operating in conjunction with a pressure transducer coupled to accumulation volume 602. Note that the downstream pressure transducer 620 may be needed for laminar and molecular flow restrictors but typically is not needed when using a sonic flow restrictor.

The space consumption and cost of a second local pressure transducer on the accumulation volume is not needed to know the pressure at the inlet to the restrictor. It is needed when using only a proportional valve but not with the e-reg present. A temperature sensor 606 (located within component 603) detects temperature (e.g., a flow restrictor and/or temperature of the process gas) and allows for accommodation of temperature measurement typically used in a massflow calculation utilizing pressure based methods commonly known in the art. A PCB 610 includes electronics to calculate flow and to adjust operation of the electronic regulator 601 (or other device) based on feedbacks from the temperature sensor and pressure sensor(s) 606, and the optional downstream pressure transducer 620.

Figure 7:
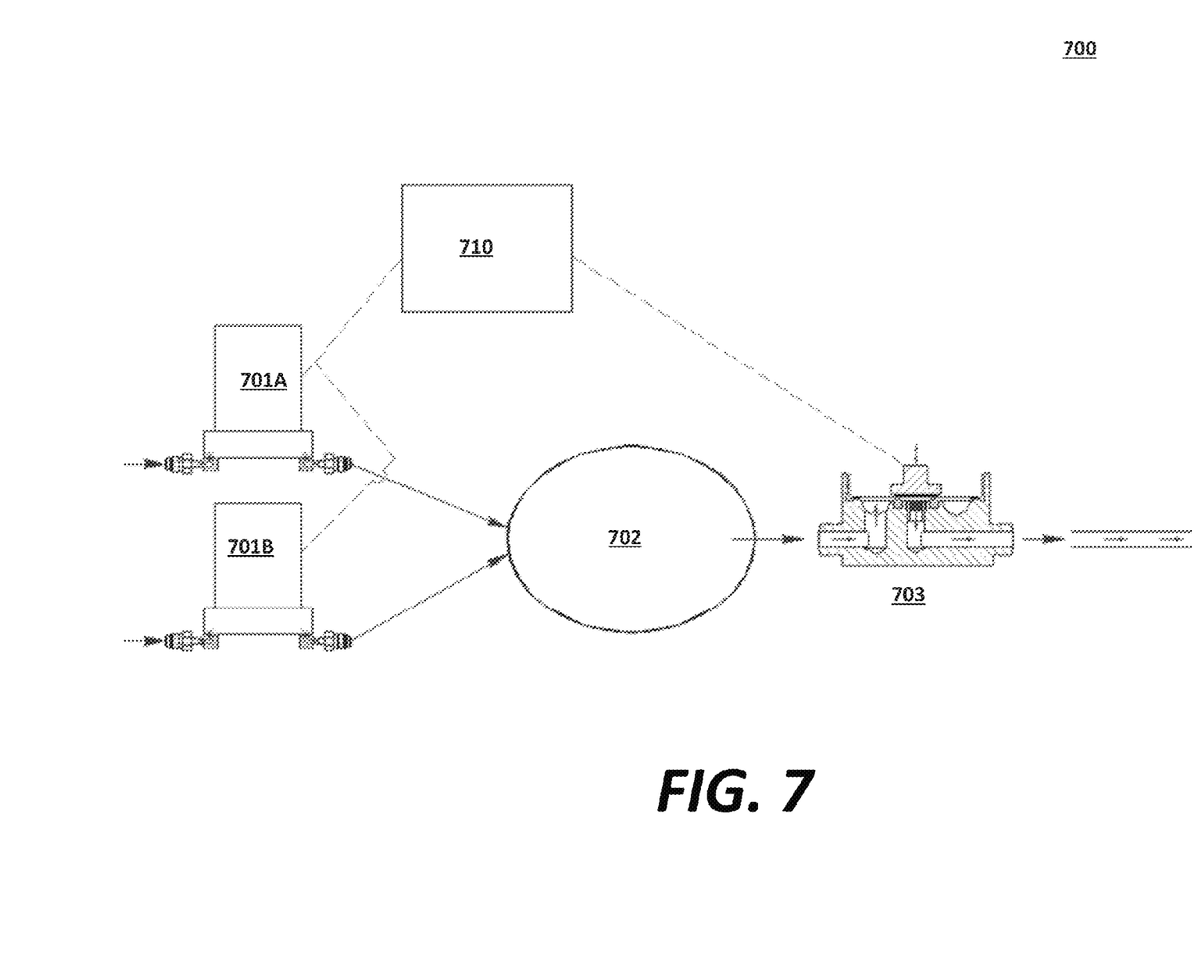
FIG. 7 is a schematic diagram illustrating a system to produce a square wave using a mixture of gases, according to one embodiment of the present invention.

FIG. 7 is a schematic diagram illustrating a system to produce a square wave of a gas mixture, according to one embodiment of the present invention. A first MFC 701A and a second MFC 702A are both connected to an accumulation volume 702 feeding component 703. A PCB 710 controls the first and second MFCs 701A,B. In one example, the first MFC 701A feeds oxygen at a mass flow rate while the second MFC 701B feeds nitrogen. The relative concentration of the two gases can be adjusted by controlling the relative set point sent to MFCs 701A to 701B by the PCB 710.

Figure 8:
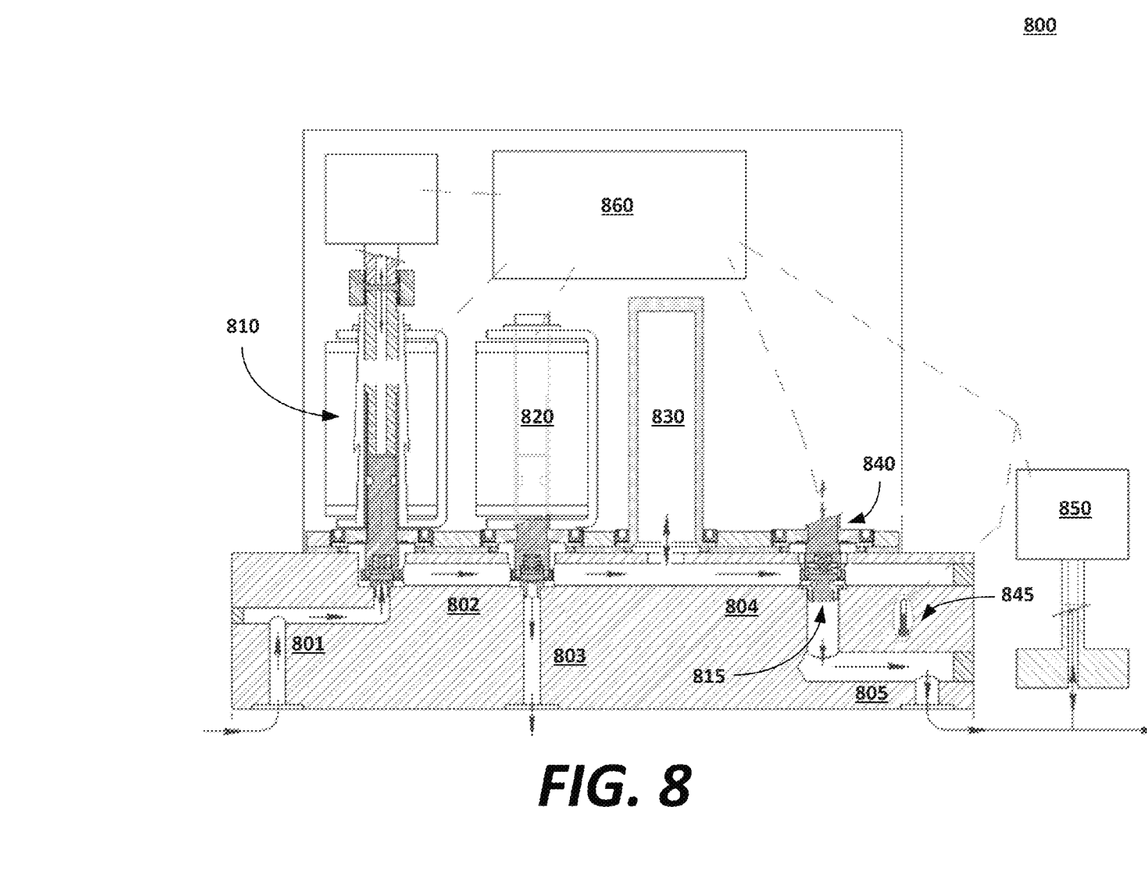
FIG. 8 is a more detailed schematic diagram illustrating an exemplary system to produce a square wave, with a relief valve and an accumulation chamber, according to one embodiment of the present invention.

FIG. 8 is a more detailed schematic diagram illustrating an example system 800 to produce a square wave, according to one embodiment of the present invention.

The system 800 includes an electronic regulator 810 coupled by a first conduit section 801 to a gas supply and coupled to a second conduit section 802. A local pressure transducer, at the top of 810, tracks pressure in the second conduit section 802.

A relief valve 820 is coupled to the second conduit portion 802 and a third conduit portion 803 and a fourth conduit portion 804. The relief vale 820 is an optional implementation for faster bleed off from an accumulation volume. Depending on the desired flow rate for the specific process, required output pressure in 804 can vary widely, and the conduit portion 803 can be activated to quickly send extra mass to a vacuum. When not needed, the relief valve 820 can remain in an closed position.

An accumulation chamber 830 is coupled to the fourth conduit portion 804. The accumulation chamber 830 adds to a total accumulation volume for improved performance, as described above. For example, the accumulation chamber 830 can add 40 cc to an existing 4 cc that might be typical of the volume between the valve seats of 810 and 840. Time constant is a function of accumulation volume, albeit to a much lesser extent than time constant is a function of the impendence of the flow restrictor (which determines the pressure in the accumulation volume). For example, the square waves of FIG. 2B display approximately ⅕th the droop of the square waves of FIG. 2A, due to a fivefold increase in accumulation volume from 20 cc in FIG. 2A to 100 cc in FIG. 2B. Thus, additional accumulation volume can further increase a time constant as needed.

An on-off valve 840 is coupled to the fourth conduit portion 804 and to a fifth conduit portion 805 that exhausts through a flow restrictor 815 to the process and a downstream pressure transducer 850, as described herein. In other embodiments, the flow restrictor 815 is located upstream from the on-off valve 840.

A PCB 860 is electronically coupled to one or more of the electronic regulator 810, the relief valve 820, the on-off valve 840, a temperature sensor 845 and the downstream pressure transducer 850. Note that the downstream pressure transducer 850 may be needed for laminar and molecular flow restrictors but typically is not needed when using sonic restrictor.

Figure 9:
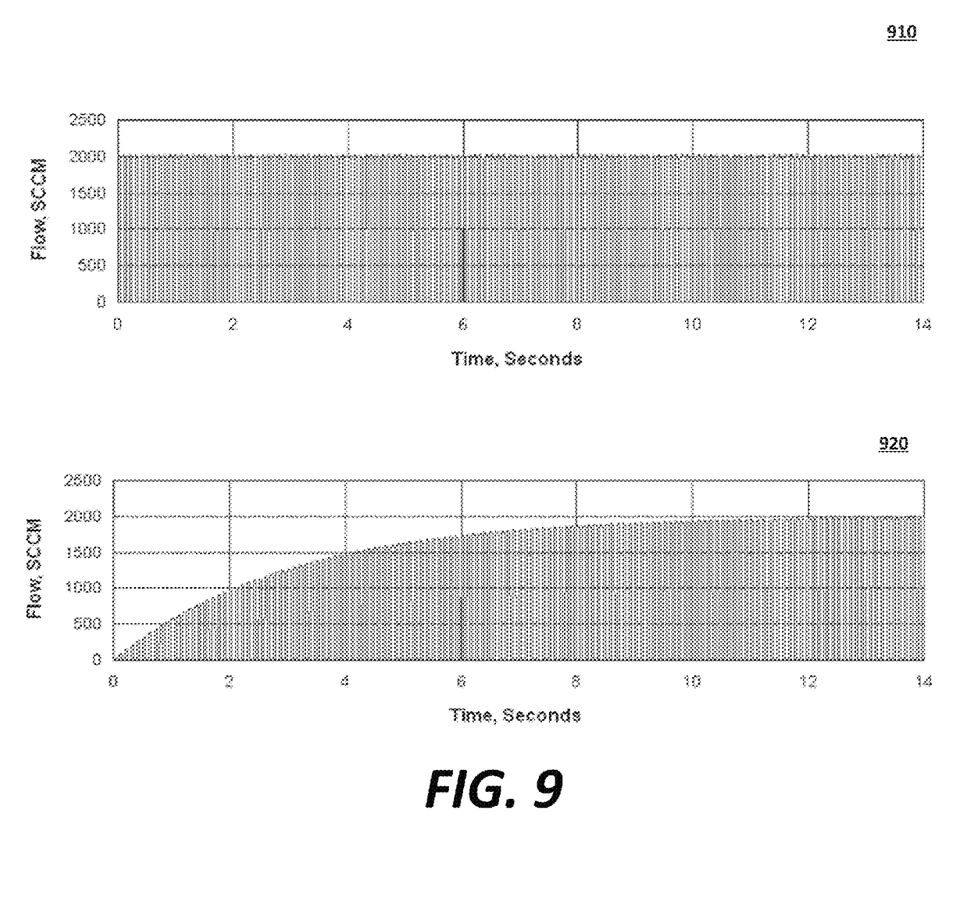
FIG. 9 shows graph with a series of square output waves produced by a gas delivery system with an electronic regulator versus a series of square output waves produced by a gas delivery system with an MFC, according to one embodiment of the present invention.

FIG. 9 shows a graph 910 with a series of square output waves produced by a gas delivery system with an electronic regulator while graph 920, whereas graph 950 shows a series of square output waves produced by a gas delivery system with an MFC. As can be seen, an electronic regulator reaches a steady-state of output characteristics almost immediately while the MFC does not. Once the MFC reaches steady-state, the performance is similar. Some implementations may not have tolerance for the ramp up time of an MFC.

In some embodiments, a higher set point is initially given to an MFC so that pressure in the accumulation volume can reach steady-state more quickly. Once at steady-state, the set points are reduced to what is necessary to maintain the desired steady-state flow. The higher set points can be used for a predetermined amount of time, or alternatively, responsive to a pressure transducer coupled to measure pressure in the accumulation volume.

Generalities of the Disclosure

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A gas delivery apparatus to output a process gas to a semiconductor process as rapid square waves by increasing a time constant to a desired time constant, comprising:
    an enclosure attached to a base with a conduit channeling through the base to receive a supply of the process gas and output the process gas from the gas delivery apparatus to the semiconductor process;
    a wave generation component comprising a gas supply component and an on-off valve downstream from the gas supply component, coupled to receive the process gas in the conduit, the wave generation component during an off cycle when the on-off valve is closed to build pressure from the process gas in an accumulation volume, and during an on cycle when the on-off valve is open to release the process gas according to a time constant; and
    a flow restrictor installed in a throat of the on-off valve to output the rapid square waves to the conduit at a desired magnitude of flow, a size of the flow restrictor selected to have an impedance that is high enough to significantly raise the time constant during the on cycle such that massflow decay in each square wave pulse over the on cycle decreases to within a certain tolerance, wherein the time constant is at least in part a function of the flow restrictor impedance.

2. The gas delivery apparatus of claim 1, wherein the flow restrictor comprises at least one of: an orifice, a venturi, a laminar flow element (LFE), or a very small-bore diameter of an outlet flow conduit.

3. The gas delivery apparatus of claim 1, wherein the flow restrictor size is selected based on one or more of: a supply pressure, a maximum massflow target, and a percentage of time for the on cycle to a total time for an on-off cycle.

4. The gas delivery apparatus of claim 1, wherein a pressure in the accumulation volume throughout on and off cycles is substantially higher than a pressure without the flow restrictor.

5. The gas delivery apparatus of claim 1, further comprising:
    an accumulation chamber, disposed in the first conduit between the gas supply component and the on-off valve, the accumulation chamber increasing an accumulation volume to further increase the time constant, wherein the time constant at least in part a function of the flow restrictor impedance and the accumulation volume,
    wherein the accumulation volume is initially defined by a volume between a valve seat of the gas supply component and the valve seat of the on-off valve.

6. The gas delivery apparatus of claim 1, further comprising:
    a relief valve, disposed in the first conduit between the gas supply component and the flow node, to reduce bleed down time of transients between gas flows by venting at least a portion of process gas from the accumulation volume.

7. The gas delivery apparatus of claim 1, wherein the gas supply component comprises at least two mass flow controllers corresponding to at least two different types of process gas mixed in the accumulation volume.

8. The gas delivery apparatus of claim 1, wherein the gas supply component comprises a mass flow controller to deliver the process gas to the accumulation at a determined mass flow rate.

9. The gas delivery apparatus of claim 8, wherein the mass flow controller is initially given a set point higher than necessary to maintain steady-state in order to build up pressure in the accumulation volume more quickly, the set point being reduced to the desired flow once the flow out to the process approaches the desired flow.

10. The gas delivery apparatus of claim 1, further comprising:
    a pressure transducer; and
    a temperature sensor, wherein the gas supply component comprises an electronic regulator to pressurize the accumulation volume to a determined pressure.

11. The gas delivery apparatus of claim 10, further comprising:
a printed circuit board (PCB), coupled to the wave generation component, the PCB containing electronics to detect and adjust flow of the process gas to the accumulation volume based on feedback from at least one of the pressure transducer and the temperature sensor.

12. The gas delivery apparatus of claim 1, wherein each of the substantially square wave pulses is characterized by a vertical ramp up time, a horizontal droop at a desired magnitude, and a vertical ramp down time, over the on cycle, within predefined tolerances.

13. A method for outputting a process gas as rapid square waves by increasing a time constant to a desired time constant, comprising the steps of:
receiving a supply of the process gas;
building pressure from the process gas in an accumulation volume during an off cycle, and releasing the process gas according to a time constant during an on cycle; and
installing a flow restrictor selected to have an impedance that is high enough to significantly raise the time constant during the on cycle such that pressure decay in each square wave pulse over the on cycle decreases to within a tolerance, wherein the time constant is at least in part a function of the flow restrictor impedance.

14. The method of claim 13, wherein the flow restrictor comprises at least one of: an orifice, a venturi, a laminar flow element (LFE), or a very small-bore diameter of an outlet flow conduit.

15. The method of claim 13, wherein the flow restrictor size is selected based on one or more of: a supply pressure, a maximum massflow target, and a percentage of time for the on cycle to a total time for an on-off cycle.

16. The method of claim 13, further comprising:
increasing an accumulation volume with an accumulation chamber to further increase the time constant, wherein the time constant at least in part a function of the flow restrictor impedance and the accumulation volume,
wherein the accumulation volume is initially defined by a volume between a valve seat of the gas supply component and the valve seat of the on-off valve.

17. The method of claim 13, further comprising:
reducing bleed down time of transients between gas flows by venting at least a portion of process gas from the accumulation volume.

18. The method of claim 13, wherein the supply of gas is provided by a mass flow controller that is initially given a set point higher than necessary to maintain a desired flow in order to build up pressure in the accumulation volume more quickly, the set point being reduced once the flow to process approaches the desired flow.

* * * * *